United States Defensive Publication [19] (H) [11] T970,001

Zannucci et al. [43] May 2, 1978

[54] BICHROMOPHORIC COMPOUNDS AS ULTRAVIOLET STABILIZERS FOR DYES ON POLYESTER FABRICS

[76] Inventors: Joseph S. Zannucci, 1112 Buckelew Dr.; Gether Irick, Jr., 424 Meadow La., both of Kingsport, Tenn. 37663

[21] Appl. No.: 788,473

[22] Filed: Apr. 18, 1977

[51] Int. Cl.[2] ..... D06P 3/00

[52] U.S. Cl. ..... 8/165; 8/1 W; 8/168 CA; 8/173; 8/179

[57] ABSTRACT

Bichromophoric compounds in which one of the moieties is a benzoxazole group and the second moiety is a hydroxybenzophenone group are excellent ultraviolet light stabilizers for disperse dyes on specific polyester fibers, and for both disperse and basic dyes on specific basic dyeable polyester fibers.

1 Claim, No Sheets Drawing,

5 Pages Specification

The file of this unexamined application may be inspected and copies thereof may be purchased (849 O.G. 1221, Apr. 9, 1968).